United States Patent
Crinon (10) Patent No.: US 7,075,584 B2
(45) Date of Patent: Jul. 11, 2006

(54) BUFFER SYSTEM FOR CONTROLLED AND TIMELY DELIVERY OF MPEG-2 DATA SERVICES

(75) Inventor: Regis J. Crinon, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 613 days.

(21) Appl. No.: 10/341,782

(22) Filed: Jan. 13, 2003

(65) Prior Publication Data
US 2003/0106069 A1    Jun. 5, 2003

(51) Int. Cl.
H04N 9/475    (2006.01)
(52) U.S. Cl. ........................ 348/518; 348/714
(58) Field of Classification Search .......... 348/512, 348/714, 518, 515, 607, 725, 497, 718; 375/371, 375/372, 240.26, 240.28, 240.25; 370/229, 370/232, 516, 235; 713/375, 400, 401, 500, 713/503, 600
See application file for complete search history.

(56) References Cited
U.S. PATENT DOCUMENTS

| | | |
|---|---|---|
| 4,394,774 A | 7/1983 | Widergren et al. |
| 5,351,092 A | 9/1994 | Poimboeuf et al. |
| 5,481,543 A | 1/1996 | Veltman |
| 5,517,250 A | 5/1996 | Hoogenboom et al. |
| 5,557,538 A | 9/1996 | Retter et al. |

(Continued)

FOREIGN PATENT DOCUMENTS
JP    0723345    7/1996

(Continued)

OTHER PUBLICATIONS

Crinon, R.J.: "ATSC data broadcast services: protocols, application signaling, buffer models, profiles and levels"; consumer electronics, 1999. ICCE. International Conference in Los Angles, CA, USEA Jun. 22-24, 1999, Poscataway, NJ, USA IEEE; US Jun. 22, 1999, pp. 4-5, XPO 0010346529 ISBN: 0-7803-5132-1 p. 5, Left Hand Column, Paragraph 2 Figure 1.

(Continued)

Primary Examiner—Victor R. Kostak
(74) Attorney, Agent, or Firm—Chernoff, Vilhauer, McClung & Stenzel (57) ABSTRACT

A data elementary buffer with underflow and overflow operational constraints is incorporated into a digital television receiver to regulate the flow of data related to an ancillary data service to be presented in synchronization with a video or audio program element. The data elementary buffer ensures that data is received in time for decoding and presentation in synchronization with the video or audio element. The data elementary buffer also limits the amount of data that the receiver may be required to cache. The minimum size of the data elementary buffer is three times the size of a nominal data access unit or three times the quantity of data that the receiver can receive at the maximum rate in the period that a video element is displayed by the receiver.

27 Claims, 2 Drawing Sheets

U.S. PATENT DOCUMENTS

| | | | |
|---|---|---|---|
| 5,559,999 | A | 9/1996 | Maturi et al. |
| 5,574,979 | A | 11/1996 | West |
| 5,598,415 | A | 1/1997 | Nuber et al. |
| 5,623,314 | A | 4/1997 | Retter et al. |
| 5,650,825 | A | 7/1997 | Naimpally et al. |
| 5,652,749 | A | 7/1997 | Davenport et al. |
| 5,694,332 | A | 12/1997 | Maturi |
| 5,742,623 | A | 4/1998 | Nuber et al. |
| 5,751,280 | A | 5/1998 | Abbott et al. |
| 5,815,634 | A | 9/1998 | Daum et al. |
| 5,828,426 | A | 10/1998 | Yu |
| 5,901,149 | A | 5/1999 | Itakura et al. |
| 6,310,921 | B1 | 10/2001 | Yoshioka et al. |
| 6,573,942 | B1 * | 6/2003 | Crinon ............... 348/518 |
| 2001/0056353 | A1 | 12/2001 | Li et al. |

FOREIGN PATENT DOCUMENTS

| | | |
|---|---|---|
| JP | 0784409 | 7/1997 |
| JP | 0843482 | 5/1998 |
| JP | 0932308 | 7/1999 |

OTHER PUBLICATIONS

ATSC: Guide to the Use of the ATSC Television Standard Paggase Guide to the Use of the ATSC Digital Television Standard, .XX, XX, Oct. 4, 1995, pp. 1-148, SPPO 02255337.

*ATSC Data Broadcast Specification*, Draft ATSC Standard, Mar. 31, 1999, total numbered pages: 72.

*ATSC Digital Television Standard*, Advanced Television Systems Committee, Sep. 16, 1995, total pages: 77.

*International Standard, ISO/IEC 13818-1*, "Information Technology-Generic Coding Of Moving Pictures and Associated Audio Information: Systems," First Edition, Apr. 15, 1996.

*International Standard ISO/IEC 13818-2*, Information Technology-Generic Coding of Moving Pictures and Associated Audio Information: Video, First edition, May 15, 1996.

* cited by examiner

BUFFER SYSTEM FOR CONTROLLED AND TIMELY DELIVERY OF MPEG-2 DATA SERVICES

This application claims priority of U.S. patent application Ser. No. 09/352,156 filed on Jul. 12, 1999 which claims the benefit of 60/096,783 filed Aug. 17, 1998.

BACKGROUND OF THE INVENTION

The present invention relates to digital television (DTV) and, more particularly, to a buffer system for a DTV receiver useful in presenting broadcast data services synchronized to the audio or visual content of a digital television program.

A digital television system includes a transmitter and a receiver which assemble programs comprising audio, video, and ancillary components for coordinated presentation to a user. The transmitter system includes subsystems to receive and compress the digital source data (the elementary or application data streams representing a program's audio, video, and ancillary data components); multiplex the data from the several elementary data streams into a single transport bit stream; and transmit the data to the receiver. At the receiver the transport bit stream is demultiplexed into its constituent elementary data streams. The elementary data streams are decoded and the audio and video data streams are delivered as synchronized program elements to the receiver's presentation subsystem for display as parts of a coordinated television program. The digital television system is described by the ATSC DIGITAL TELEVISION STANDARD, Advanced Television Systems Committee, Doc A/53, 23 Dec. 1997 incorporated by reference herein. The system employs the MPEG-2 systems and video stream syntax of ISO/IEC DIS 13818-1 & 2, INFORMATION TECHNOLOGY—GENERIC CODING OF MOVING PICTURES AND ASSOCIATED AUDIO INFORMATION, International Standards Organization, 1995, 16 Sep. 1995, incorporated by reference herein. Audio coding is in accordance with the DIGITAL AUDIO COMPRESSION STANDARD (AC-3), Advanced Television Systems Committee, Doc A/52, 16 Nov. 1994, 20 Dec. 1995, incorporated by reference herein.

In addition to the basic audio and video content of a televison program, digital television provides the opportunity to augment televison programming with a range of ancillary data services. Ancillary data services described in the ATSC DIGITAL TELEVISION STANDARD include control data; conditional access control data associated with limited access to scrambled signals; and data associated with program audio and video services such as "closed captioning," emergency broadcasts, and a program guide containing information about the audio, video, and data content of programs being transmitted or to be transmitted in the future.

In addition to these basic ancillary data services, the digital televison standard envisions the broadcast of additional ancillary or private data services. The contents of these services are to be defined in the future by developers of digital television content. These data services can include asynchronous, synchronous, and synchronized streaming and non-streaming data. Synchronized streaming and non-streaming data afford the opportunity to provide data services that are associated with a particular audio or visual instant of a television program. The suite of ATSC digital television standards will include a specification for data broadcasting drafted by the T3S13 working group of the Advanced Television Systems Committee. This ATSC DATA BROADCAST SPECIFICATION, currently in draft form, is expected to include data and system specifications to facilitate data transmission in a manner compatible with the digital multiplex bit streams of ISO/IEC 13818-1 (MPEG-2 Systems) used in digital television video broadcasting. The specification is also expected to describe mechanisms necessary to permit ancillary data to be associated with particular audio or visual content in a television broadcast.

The ATSC DIGITAL TELEVISION STANDARD describes a model for a hypothetical ancillary services target system decoder for a DTV receiver. This idealized decoder is modeled after a conceptual model for a transport stream system target decoder (T-STD) described in the ISO/IEC 13818-1:1996 (MPEG-2) standard. The MPEG-2 conceptual T-STD model comprises an individual system target decoder for each of the elementary data streams representing the video, audio, and system information components of a television program. However, the MPEG-2 system specification does not define a complete system target decoder for ancillary, synchronized data services.

The ATSC model ancillary services target system decoder includes a buffer system linking the receiver's transport stream demultiplexer with the application decoder for the specific type of elementary data stream being decoded. The transport stream demultiplexer separates and reconstructs the several elementary streams from the single multiplexed MPEG-2 transport bit stream. The application decoders decode the data elements or access units making up the data elementary streams in preparation for presentation to the user. The ATSC model ancillary services target decoder, as well as the decoder described in the European Digital Video Broadcasting Consortium (DVB) specification, are two buffer systems with a 512-byte transport buffer followed by a smoothing buffer.

For synchronized presentation of streaming data the DTV receiver must be able to collect the packets of data, reassemble them into data access units (an elemental unit of data to be decoded and presented in association with an instant in a video or audio bit stream), and send them to the application decoder that is processing the data and converting the data to a form suitable for presentation at the desired time instant. If the receiver receives the data earlier or at a faster rate than required, the excess data must be stored in a buffer. On the other hand, sufficient data must be readily available in the receiver or the presentation will not be smooth and properly synchronized to the video or audio content.

The ATSC model for an ancillary service target decoder consists of a transport demultiplexing buffer and a smoothing buffer. However, there is no buffer for reconstructing data access units to be decoded and then presented in synchronization with the audio or visual elements of a program. Likewise, the size of a data access unit, the frequency of transmission of data access units, and the method of synchronization is not established by the ATSC DIGITAL TELEVISION STANDARD and not contemplated by the MPEG-2 specification. Derivation of the general T-STD model for all kinds of ancillary data is not straightforward because the decoding model for ancillary data can be anything from simple to complex. As a result, the quantity of data the receiver may be required to cache might exceed its capacity (a condition of memory overflow) or throughput capabilities. Alternatively, the receiver may fail to receive all of the data in a data access unit in time for decoding and synchronized presentation with a specified instant in the audio or video data streams resulting in a loss of data and inconsistent performance (a condition of memory underflow).

What is desired, therefore, is a buffer system for an ancillary service target decoder for synchronized data services that establishes the size limits of a data access unit for those services and enforces a transmission schedule on the MPEG-2 multiplexer of the transmitter or emission station such that the data arrives in time for proper synchronized presentation but in a quantity and at a rate which will not overwhelm the receiver so no data is lost.

SUMMARY OF THE INVENTION

The present invention overcomes the aforementioned drawbacks of the prior art by providing a buffer mechanism to regulate delivery of data for synchronized presentation by a digital television receiver that includes a smoothing buffer, the buffer mechanism comprising a data elementary buffer constrained to operate without overflow and underflow of data, to receive the data from the smoothing buffer. Further, the size of the data elementary buffer is a function of the quantity of data that can be received by the receiver in the period in which it displays a video element, such as a frame or a field.

A target system decoder for a synchronized ancillary data service for a digital television receiver is also provided comprising a transport buffer receiving transport stream data packets for the synchronized ancillary data service from a transport stream demultiplexer; a smoothing buffer receiving transport stream data packets from the transport buffer at a transport buffer leak rate; a first-in, first-out data elementary buffer, constrained to operate without overflow and underflow of data, receiving elementary data stream packet payload data from the smoothing buffer at a smoothing buffer leak rate and aggregating the elementary data stream packet data to reconstruct a data access unit; and an application decoder receiving the data access unit from the data elementary buffer at a specified time.

Further, a method of buffering data for synchronized presentation with an instant of a visual or audio data stream by a digital televison receiver is provided comprising setting an appropriate size for a data elementary buffer to aggregate data to reconstruct an access unit of data, the data elementary buffer being constrained to operate without overflow or underflow of data; removing an access unit of data from the data elementary buffer for presentation at a removal time correlated with a presentation time stamp included in the visual or audio data stream; and adding data to the data elementary buffer from a smoothing buffer.

The buffer of the ancillary service target decoder causes the flow of data from the DTV transmitter to the receiver to be regulated so that data to be presented in synchronization with an instant of an audio or visual element of the program will be available in the ancillary data services application decoder in time to be decoded and presented in coordination with the corresponding instant of the visual or audio program element. The operating constraints of the data elementary buffer impose conditions that must be observed by the multiplexer at the emission station to prevent overflow of data which would result in the loss of data. The size of the data elementary buffer limits the quantity of data that can be held at the receiver and, therefore, the period of time the data can be held before decoding. A minimum time interval between removal of two consecutive data access units provides an upper bound on the data transfer capabilities to be supported in data receivers.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
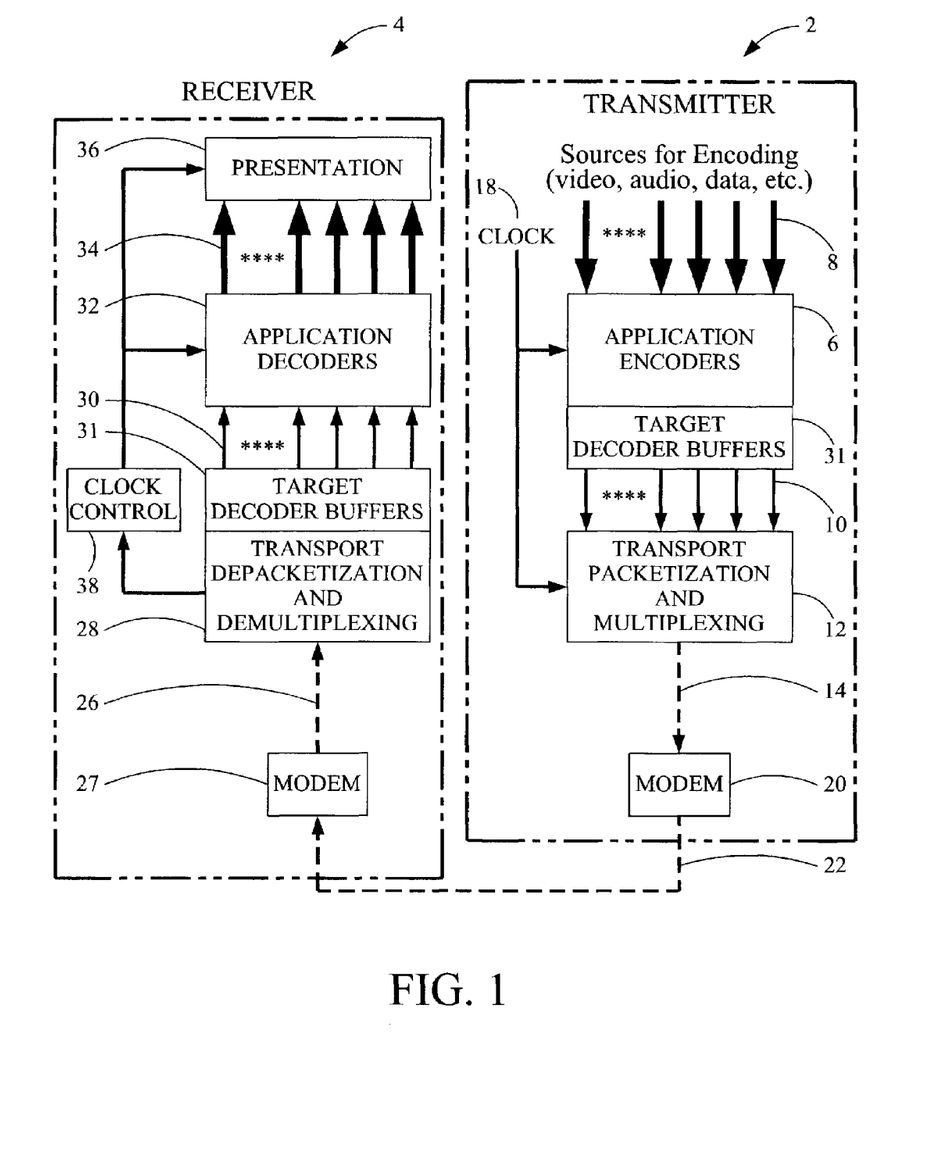
FIG. 1 is a block diagram of a digital television transmitter and receiver.

Referring to FIG. 1, a digital television system comprises a transmitter 2 or emission station and a receiver 4. The transmitter 2 includes facilities to receive a plurality of streams of digital source data 6, each stream representing a video, an audio, or an ancillary data services component of a television program. Ancillary data services described in the ATSC DIGITAL TELEVISION STANDARD include control data, conditional access data which scrambles the program unless the decoder has the proper key, and data associated with program audio and video services, such as system information for acquiring the program elements, information for a program guide, emergency messages, and "closed captioning" services.

In addition to the basic ancillary data services, the ATSC standard envisions the broadcast of additional ancillary or private data services. The scope of private data services is expected to be defined in the future as new uses and features are developed for the digital television system. For example, such services might include interactivity features permitting the user to respond to the video and audio content of a television program. The ATSC standard envisions these data services being transmitted as asynchronous, synchronous, or synchronized streaming and non-streaming data.

In the transmitter 2 the source data streams 6 are processed in application encoders 8 which perform data encoding and formatting to reduce the bit rate that must be transmitted. Application encoders 8 include data servers for ancillary data elementary streams. The digital television system employs compression techniques from the MPEG-2 toolkit and the video stream syntax specified in the MPEG-2 standard, ISO/IEC 13818-1, INFORMATION TECHNOLOGY—GENERIC CODING OF MOVING PICTURES AND ASSOCIATED AUDIO INFORMATION, International Standards Organization, 1995. Audio coding is in accordance with the DIGITAL AUDIO COMPRESSION STANDARD (AC-3), Advanced Television Systems Committee, Doc A/52, 16 Nov. 1994, 20 Dec. 1995. The data servers generate data packets according to the protocol encapsulation, packetization layers, synchronization layers, and protection layers defined in the draft ATSC T3S13 DATA BROADCAST SPECIFICATION. The encoded and formatted elementary bit streams 10 are passed to the transport packetization and multiplexing subsystem 12 where each of the elementary data streams 10 is divided into packets. Input of a program element to the transport packetization and multiplexing unit is in accordance with the limitations imposed by the transport system target decoder model associated with that program element. For example, transport packetization and multiplexing of ancillary services information is in accordance with the limitations imposed by the ancillary services system target decoder model. This includes conditions to prevent overflow and underflow of data and an excessive data transfer rate to the receiver. Timing information is included in the packets of the elementary streams and the several packetized elementary streams are multiplexed into a single transport bit stream 14. The data encoding and packetization are synchronized by a system clock 18. The transport bit stream 14 is passed to a modem subsystem 20 for transmission. In terrestrial broadcast television the modem subsystem 20 may be a radio frequency transmission system which uses the digital data in the transport stream to modulate a transmitted signal 22. Other modem systems could be used for satellite or cable transmission and, at least some, systems are expected to include two-way communication for interactivity.

The transmitted signal 22 is received by a modem subsystem 24 in the receiver 4. The transport data stream 26 with error signaling is forwarded to the transport depacketization and demultiplexing subsystem 28 where the elementary bit streams 30 for each of the program elements are demultiplexed and recovered from the transport data stream 26. The buffers 31 of the transport stream system target decoder, which include individual target decoders for the video, audio, system data and ancillary data streams, link the transport demultiplexing system 28 with the application decoders 32. In the application decoders 32 streams of consecutive elementary audio, video, and ancillary data access units are decoded and reassembled into elementary data streams 34. The elementary data streams 34 are forwarded to the presentation subsystem 36 for display, sound generation or other action. Decoding and presentation of the program elements are coordinated by a system clock control 38 which is derived from the program clock references (PCRs).

Figure 2:
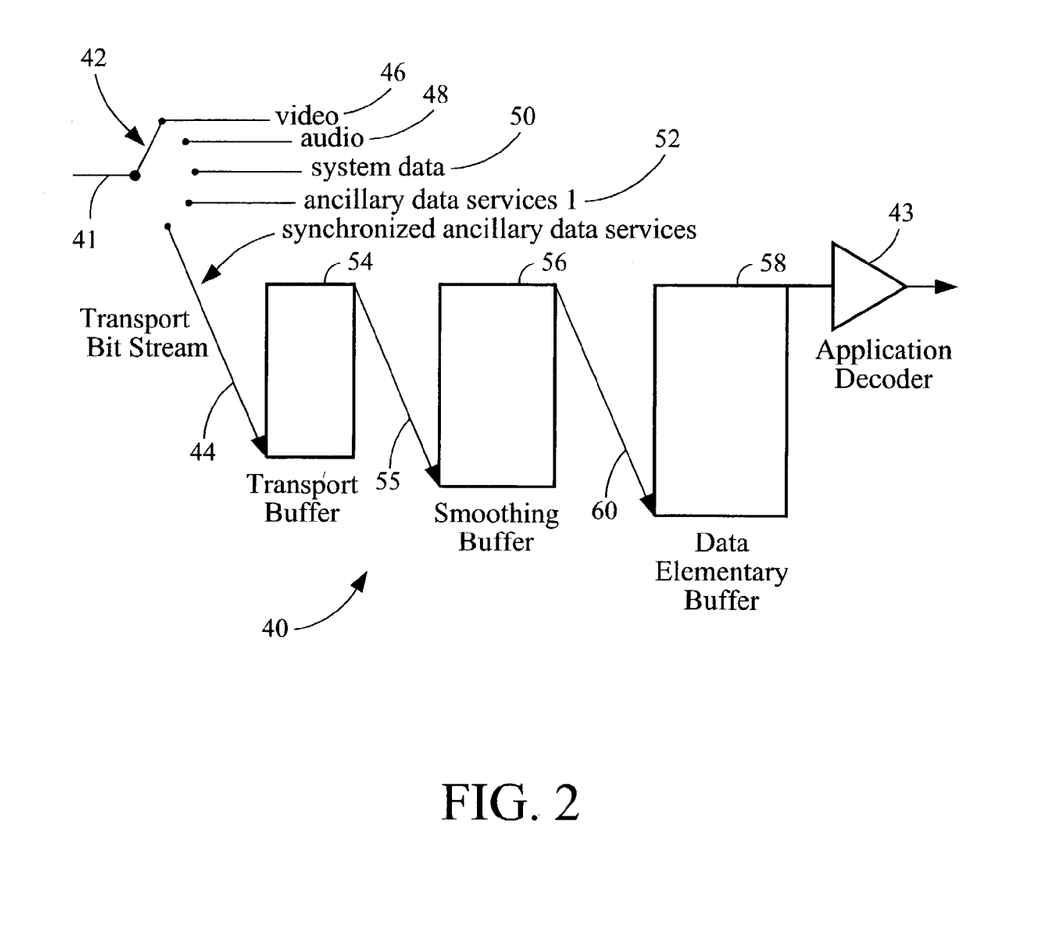
FIG. 2 is a block diagram of an ancillary data service target decoder according to the present invention.

Referring to FIG. 2, the buffers of the ancillary service target decoder for synchronized data services 40 of the present invention link the transport stream demultiplexer 42 and the application decoder 43 for a synchronized ancillary data service data stream 44. The transport demultiplexer 42 separates the transport bit stream 41 into streams of transport packets for each of the program elements which can include a data stream for video 46 and one or more streams for audio 48, system data 50 and ancillary data services 44 and 52. The transport demultiplexer 42 directs the data in each of the transport packet data streams to a transport system target decoder for that stream. In the ancillary data service target decoder for synchronized data services 40, complete transport data packets as indicated by the packet identifier (PID) in the transport packet header are passed to the transport buffer 54 at the transport stream rate. Packets transferred to the transport buffer 54 include duplicate packets and packets without payloads. The purpose of the transport buffer is to prevent transmission of large bursts of transport packets pertaining to the same program element. Consistent with the ISO transport system target decoder model, the size of the transport buffer 54 of the ancillary services target decoder for synchronized data services 40 is 512 bytes.

The draft ATSC DATA BROADCAST SPECIFICATION includes the definition of data service profiles and levels for DTV systems. These capabilities are signaled in a data broadcast descriptor structure in an event information table or data information table of the ATSC program and system information protocol (PSIP). The maximum data rate of a receiver varies according to an MPEG-2 specified data service profile, as follows:

| Data Service Profile | G1 | G2 | G3 | A1 |
|---|---|---|---|---|
| Maximum Data Rate | 383,896 bps | 3,838,960 bps | 19.2 Mbps | 19.2 Mbps |

If there is data in the transport buffer, the data is removed from the transport buffer 54 at a rate of 1.2 times the maximum data rate of the system as identified by the MPEG-2 data service profile for the broadcast. In the transport system target decoder of the present invention, the transport buffer 54 is not permitted to overflow to prevent loss of data. This constraint must be taken into account by the data server of the emission station so that no ancillary service transport packet is inserted into the multiplexer that could trigger an overflow in the transport buffer 54.

Data bytes 55 in the transport buffer 54 that are part of an ISO/IEC 13818-1 packetized elementary stream (PES) packet or an ISO/IEC 13818-6 digital storage media command and control (DSM-CC) section are transferred to a smoothing buffer 56. Other bytes in the transport stream packet and duplicate packets are not included in the data 55 transferred to the smoothing buffer 56. The smoothing buffer is not permitted to overflow. The size of the smoothing buffer is determined by the data service profile of the receiver but is typically 4096 bytes for the ancillary service target decoder 40.

All data bytes 60 of data elementary stream packets of a synchronized data service elementary data stream are passed to the data elementary buffer 58 from the output of the smoothing buffer 56. The data elementary buffer 58 is a first in-first out buffer from which all bytes representing a data access unit of a streaming synchronized data service are removed at the time specified in the presentation time stamp (PTS) of the elementary stream packet, assuming that decoding of the data access unit is instantaneous. Once decoded, each data access unit is presented at the time specified by the presentation time stamp (PTS) value associated with the data access unit. Presentation includes any action triggered at the time specified by the PTS, including display on a monitor. Presentation of the data access unit is synchronized with the presentation of the instant of audio and video content of the program having the same PTS.

Since decoding is not, in reality, instantaneous, a data access unit must be removed from the data elementary stream buffer at a time earlier than the time specified for presentation to allow for decoding. For streaming synchronized data elementary streams, a data access unit is removed from the data elementary stream buffer at the time specified by the PTS for the previous data access unit. For non-streaming synchronized data elementary streams, data access units are removed from the data elementary buffer at a time explicitly or implicitly specified for that data access unit. A decoding time stamp (DTS) in the bitstream and associated with the data access unit may be used for explicit specification of decoding time. Implicit specification of decoding time may be accomplished by a global negative offset signaled outside of the data elementary stream that specifies the time before the appropriate PTS for removing the data access unit from the data elementary buffer. The decoding time associated with any data access unit is only an indication of the actual time required and receivers may take an access unit at a later time if the receiver has sufficient computing capability to perform decoding in a lesser amount of time.

The present inventor realized that a data elementary buffer that is not allowed to overflow would set an upper limit on the size of the basic data unit of the elementary data stream (the data access unit). Data loss occurs if the data elementary buffer should overflow and, therefore, data is not transferred from the smoothing buffer 56 if the data elementary buffer 58 is full. Further, the data elementary buffer imposes a transmission schedule on the multiplexer of the transmitter causing time sensitive broadcast data to be delivered to the receiver in a controlled fashion. For example, if the data elementary buffer is not permitted to underflow, a data access unit must have been received in full before it is removed from the buffer. A no underflow constraint in the receiver, therefore, requires that complete data access units be delivered to the data decoder 43. In addition, restricting the time between the PTS of two consecutive data access units in the data elementary buffer guarantees a maximum data transfer capability (throughput) in the receiver. Such a restriction is desirable to establish the speed of the receiver's hardware or the speed of the interfaces forwarding data access units to external devices. The maximum rate of data transfer from the data elementary buffer 58 to the ancillary data service application decoder 43 is determined by minimum time that must elapse between the PTS of two consecutive data access units. To take advantage of a variety of potential output devices, including television and computer monitors, this time is set at 5.561111 milliseconds in the ATSC DATA BROADCAST SPECIFICATION so that the maximum leak rate should not exceed 200 Mbps for an IEEE 1394 data bus.

The data in the synchronized ancillary data services elementary stream is to be displayed in synchronized association with a particular instant in another elementary stream, most likely the video stream. Therefore, the inventor concluded that the size of the nominal data access unit and the data elementary buffer 58 should be a function of the quantity of data that the system can receive during a reference period of significance to the video data stream. As an example, the video frame rate of the DTV system is 30 frames per second. For the data related to a synchronized data service to remain synchronized with the video, the quantity of data in a unit to be decoded for display with a frame of video or a data access unit cannot exceed the maximum data rate of the system multiplied by the frame period (1/30th sec.). For a system capable of a data service maximum bit rate of 19.2 Mbps, the maximum size of a data access unit synchronized to the frame rate is approximately 80 KB (1/30 sec.×19.2 Mbps). Likewise, nominal data access units could be sized for association with some division or multiple of the frame rate. Sizing the data access unit for transmission at the field rate of the DTV system (60 fields per second) results in a data access unit of 40,040 bytes with a nominal frequency of 59.94 Hz at 19.2 Mbps. To handle data at this rate the minimum leak rate from the data elementary buffer 58 is 172.8 Mbps.

The size of the data elementary buffer 58 is derived from the size of a data access unit and the desired function of the buffer. The inventor concluded that the minimum size of the data elementary buffer 53 for proper functioning should be three nominal data access units. Therefore, the minimum size of the data elementary buffer 58 is 120,120 bytes. A buffer of this size permits a first data access unit to be in the process of being removed from the buffer, a second data access unit to be held ready, and a third data access unit to be in the process of being input to the buffer. In the ancillary data services data elementary stream, the size of data access units can vary as long as no overflow or underflow of the data elementary buffer occurs. If a transport stream contains multiple synchronized data elementary streams and these data streams belong to the same data service, the data elementary buffer is divided equally to accommodate the acquisition and reconstruction of the data access units of each stream.

If the data elementary buffer is not full, data is transferred from the smoothing buffer 56 to the data elementary buffer 58 at a leak rate which is function of the maximum data rate of the system for the data services profile. The maximum terrestrial data rate is approximately 19.2 Mbps (allowing for overhead in the transport stream). A smoothing buffer leak rate of 19.2 Mbps is adequate for systems incorporating the maximum data transmission rate but excessive for a system with a G1 service profile with a maximum data rate of 384 Kbps. Additional data capacity can be incorporated into the data elementary buffer to accommodate different levels of data services with higher data transfer rates.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A buffer mechanism to regulate delivery of data for synchronized presentation by a digital television receiver that includes a transport buffer having a transport buffer data capacity, a smoothing buffer for receiving data from said transport buffer and having a smoothing buffer data capacity larger than said transport buffer data capacity, and a data elementary buffer for receiving said data for synchronized presentation by said digital television receiver from said smoothing buffer and having a data elementary buffer data capacity larger than said smoothing buffer data capacity, said data elementary buffer constrained to operate without overflow and underflow of said data for synchronized presentation by said digital television reciever.

2. The buffer mechanism of claim 1 wherein said data elementary buffer data capacity is a function of a quantity of said data for synchronized presentation by said digital television receiver that can be received by said receiver in a period of display of a video element by said receiver.

3. The buffer mechanism of claim 2 wherein said video element is one of a video field and a video frame.

4. The buffer mechanism of claim 1 wherein said data elementary buffer data capacity is, at least, approximately three times a maximum quantity of said data for synchronized presentation by said digital television receiver that can be received by said receiver in a period of display of a video element by said receiver.

5. The buffer mechanism of claim 4 wherein said video element is one of a video field and a video frame.

6. The buffer mechanism of claim 1 wherein data is removed from said transport buffer at a removal rate that is greater than a maximum rate of a data service profile for a broadcast to be received by said digital television receiver.

7. The buffer mechanism of claim 6 wherein said removal rate from said transport buffer is approximately 1.2 times said maximum rate of said data service profile for said broadcast to be received by said digital television receiver.

8. A target system decoder for a synchronized ancillary data service for a digital television receiver comprising:
   (a) a transport buffer receiving a first plurality of transport stream data packets for said synchronized ancillary data service from a transport stream demultiplexer and having a transport buffer data capacity;
   (b) a smoothing buffer receiving a second plurality of transport stream data packets from said transport buffer at a transport buffer leak rate and having a smoothing buffer data capacity larger than said transport buffer data capacity;
   (c) a first-in, first-out data elementary buffer, constrained to operate without overflow and underflow of data, receiving elementary data stream packet data from said smoothing buffer at a smoothing buffer leak rate and aggregating said elementary data stream packet data to reconstruct a data access unit, said data elementary buffer having a data elementary buffer data capacity larger than said smoothing buffer data capacity; and
   (d) an application decoder receiving said data access unit from said data elementary buffer at a specified admission time.

9. The decoder of claim 8 wherein said data elementary buffer data capacity is a function of a quantity of said data that can be received by said receiver in a period of display of a video element by said receiver.

10. The decoder of claim 9 wherein said video element is one of a video field and a video frame.

11. The target system decoder of claim 8 wherein said data elementary buffer data capacity is, at least, approximately three times a maximum quantity of said data that can be received by said receiver in a period of display of a video element by said receiver.

12. The target system decoder of claim 11 wherein said video element is one of a video field and a video frame.

13. The target system decoder of claim 8 wherein said admission time for said application decoder is a time specified by a presentation time stamp for another said data access unit removed from said data elementary buffer at an earlier time.

14. The target system decoder of claim 8 wherein said admission time for said application decoder is a time specified by a decoding time stamp.

15. The target system decoder of claim 8 wherein said admission time for said application decoder is specified as a period of time in advance of a presentation time stamp for admission of said data access unit to said application decoder.

16. The decoder of claim 8 wherein said transport buffer leak rate is greater than a maximum rate of a data service profile for a broadcast to be received by said digital television receiver.

17. The decoder of claim 16 wherein said transport buffer leak rate is approximately 1.2 times said maximum rate of said data service profile for said broadcast to be received by said digital television receiver.

18. A method of buffering data using a target system decoder for a synchronized ancillary data service for a digital television receiver, said method comprising:
   (a) receiving by a transport buffer having a transport buffer data capacity a first plurality of transport stream data packets for said synchronized ancillary data service from a transport stream demultiplexer;
   (b) receiving by a smoothing buffer having a smoothing buffer data capacity larger than said transport buffer data capacity a second plurality of transport stream data packets from said transport buffer at a transport buffer leak rate;
   (c) receiving by a first-in, first-out data elementary buffer, constrained to operate without overflow and underflow of data, elementary data stream packet data from said smoothing buffer at a smoothing buffer leak rate and aggregating said elementary data stream packet data to reconstruct a data access unit, said data elementary buffer having a data elementary buffer data capacity larger than said smoothing buffer data capacity; and
   (d) receiving by an application decoder said data access unit from said data elementary buffer at a specified admission time.

19. The method of claim 18 wherein said data elementary buffer data capacity is a function of a quantity of said data that can be received by said receiver in a period of display of a video element by said receiver.

20. The method of claim 19 wherein said video element is one of a video field and a video frame.

21. The method of claim 18 wherein said data elementary buffer data capacity is, at least, approximately three times a maximum quantity of said data that can be received by said receiver in a period of display of a video element by said receiver.

22. The method of claim 21 wherein said video element is one of a video field and a video frame.

23. The method of claim 18 wherein said admission time for said application decoder is a time specified by a presentation time stamp for another said data access unit removed from said data elementary buffer at an earlier time.

24. The method of claim 18 wherein said admission time for said application decoder is a time specified by a decoding time stamp.

25. The method of claim 18 wherein said admission time for said application decoder is specified as a period of time in advance of a presentation time stamp for admission of said data access unit to said application decoder.

26. The method of claim 18 wherein said transport buffer leak rate is greater than a maximum rate of a data service profile for a broadcast to be received by said digital television receiver.

27. The method of claim 26 wherein said transport buffer leak rate is approximately 1.2 times said maximum rate of said data service profile for said broadcast to be received by said digital television receiver.

* * * * *

UNITED STATES PATENT AND TRADEMARK OFFICE
CERTIFICATE OF CORRECTION

PATENT NO.        : 7,075,584 B2
APPLICATION NO.   : 10/341782
DATED             : January 13, 2003
INVENTOR(S)       : Regis J. Crinon It is certified that error appears in the above-identified patent and that said Letters Patent is hereby corrected as shown below:

<u>Column 7, line 59</u>
Change "data elementary buffer 53" to --data elementary buffer 58--

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,075,584 B2 |
| APPLICATION NO. | : 10/341782 |
| DATED | : July 11, 2006 |
| INVENTOR(S) | : Regis J. Crinon |

It is certified that error appears in the above-identified patent and that said Letters Patent is hereby corrected as shown below:

<u>Column 7, line 59</u>
Change "data elementary buffer 53" to --data elementary buffer 58--

This certificate supersedes Certificate of Correction issued December 5, 2006.

Signed and Sealed this

Second Day of January, 2007

JON W. DUDAS
*Director of the United States Patent and Trademark Office*